US012659638B2

(12) United States Patent
Zhang

(10) Patent No.: US 12,659,638 B2
(45) Date of Patent: Jun. 16, 2026

(54) SPEAKER BOX

(71) Applicant: AAC Microtech (Changzhou) Co., Ltd., Changzhou (CN)

(72) Inventor: Chao Zhang, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 210 days.

(21) Appl. No.: 18/525,789

(22) Filed: Nov. 30, 2023

(65) Prior Publication Data

US 2024/0406605 A1 Dec. 5, 2024

Related U.S. Application Data

(63) Continuation of application No. PCT/CN2023/096715, filed on May 29, 2023.

(51) Int. Cl.
*H04R 1/02* (2006.01)

(52) U.S. Cl.
CPC ............. *H04R 1/023* (2013.01); *H04R 1/025* (2013.01); *H04R 2400/11* (2013.01)

(58) Field of Classification Search
CPC ..... H04R 1/023; H04R 1/025; H04R 2400/11
See application file for complete search history.

(56) References Cited

U.S. PATENT DOCUMENTS

| | | | | |
|---|---|---|---|---|
| 2018/0206011 | A1* | 7/2018 | Han | H04R 1/2842 |
| 2018/0206030 | A1* | 7/2018 | Cross | H04R 1/2819 |
| 2019/0098385 | A1* | 3/2019 | Han | H04R 9/06 |
| 2019/0342644 | A1* | 11/2019 | Chen | H04R 1/288 |
| 2020/0213753 | A1* | 7/2020 | Cao | H04R 9/06 |
| 2023/0217179 | A1* | 7/2023 | Liu | H04R 9/025 381/345 |
| 2024/0147161 | A1* | 5/2024 | Zhang | H04R 7/06 |

* cited by examiner

*Primary Examiner* — Oyesola C Ojo
(74) *Attorney, Agent, or Firm* — Wiersch Law Group

(57) ABSTRACT

The present invention provides a speaker box including a housing having a receiving room and a speaker received in the receiving room. The speaker includes a frame, a diaphragm and a magnetic circuit system supported on the frame. The speaker separates the receiving room into a front cavity for transmitting a sound and a rear cavity. The speaker has a back cavity, and the back cavity is communicated with the rear cavity. The housing includes an outer surface and an inner surface. The housing includes a leakage hole communicating the rear cavity and an outside. The speaker box further includes an air-permeable mesh covering the leakage hole. A size of the leakage hole located on the outer surface is larger than the size of the leakage hole located on the inner surface. The speaker box of present invention can effectively avoid the problem of amplitude deviation during work.

6 Claims, 3 Drawing Sheets

SPEAKER BOX

FIELD OF THE PRESENT INVENTION

The present invention relates to the field of electro-acoustic conversion, and more particularly, to a speaker box.

DESCRIPTION OF RELATED ART

Speaker box is a commonly used sound-generating device in electronic equipment. The speaker box usually includes a shell structure and a sound-generating unit contained in the shell structure. In detail, in related art, the speaker box includes a shell structure and a sounding unit. The sounding unit divides a space in the housing structure into a front cavity and a rear cavity. The shell structure includes an upper cover and a lower cover assembled with the upper cover to form a receiving space. The sounding unit is accommodated in the receiving space. The lower cover is further provided with a leakage hole. However, the conventional leakage hole has a structure with a constant aperture, which can easily cause the amplitude of the speaker box to deviate during normal operation, causing the amplitude to deviate to one side, thereby affecting the acoustic performance of the speaker box.

Therefore, it is desired to provide a new speaker box which can overcome the above problems.

SUMMARY

In view of the above, the embodiments of the present invention provide a new speaker box with excellent acoustic performance.

The present invention provides a speaker box including a housing having a receiving room and a speaker received in the receiving room. The speaker includes a frame, a diaphragm and a magnetic circuit system supported on the frame. The speaker separates the receiving room into a front cavity for transmitting a sound generated by the speaker and a rear cavity opposite to the front cavity. The speaker has a back cavity, and the back cavity is communicated with the rear cavity. The housing includes an outer surface and an inner surface opposite to the outer surface. The housing includes a leakage hole communicating the rear cavity and an outside. The speaker box further includes an air-permeable mesh covering the leakage hole. A size of the leakage hole located on the outer surface is larger than the size of the leakage hole located on the inner surface.

As an improvement, the leakage hole includes a first portion with a size gradually decreasing by extending from the outer surface of the housing toward a direction of the inner surface.

As an improvement, a cross section of the first portion along a vibration direction of the diaphragm is a truncated cone.

As an improvement, the leakage hole includes a second portion extending from the first portion toward the direction of the inner surface, and a cross section of the second portion along the vibration direction of the diaphragm is a rectangular shape.

As an improvement, the leakage hole includes a third portion extending from the second portion toward the direction of the inner surface, and a cross section of the third portion along the vibration direction of the diaphragm is a rectangular shape, and the size of the third portion is larger than the size of the second portion.

As an improvement, the housing is provided with a recessed portion receiving the air-permeable mesh and a protruding portion in the receiving room corresponding to a position of the recessed portion, and the leakage hole is located on the protruding portion.

As an improvement, the air-permeable mesh includes a groove corresponding to the first portion of the leakage hole.

As an improvement, the housing includes a lower housing provided with the leakage hole, an upper housing covered with the lower housing and provided with an opening, and a spacer arranged around the opening, the speaker box further including an air-permeable film located on the spacer and covering the opening, the diaphragm, the upper housing, the spacer and the air-permeable film cooperated to form the front cavity.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
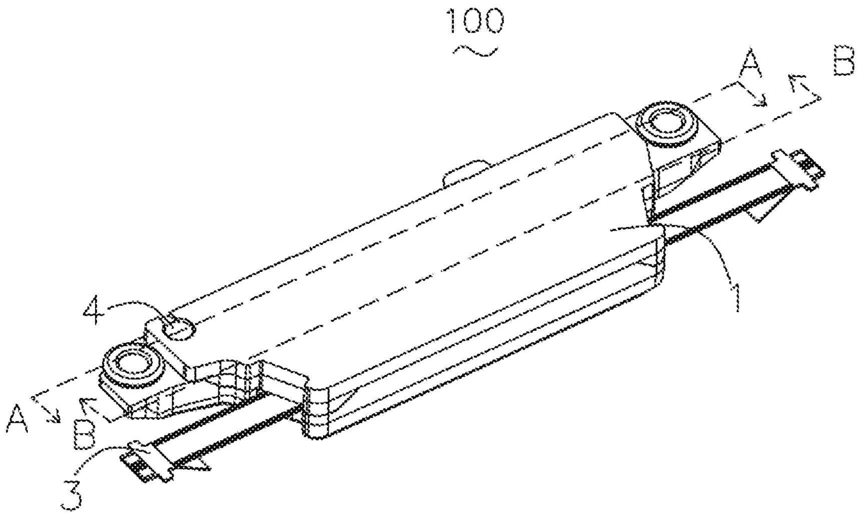
FIG. 1 is an illustrative isometric view of a speaker box in accordance with one embodiment of the present invention.
Figure 2:
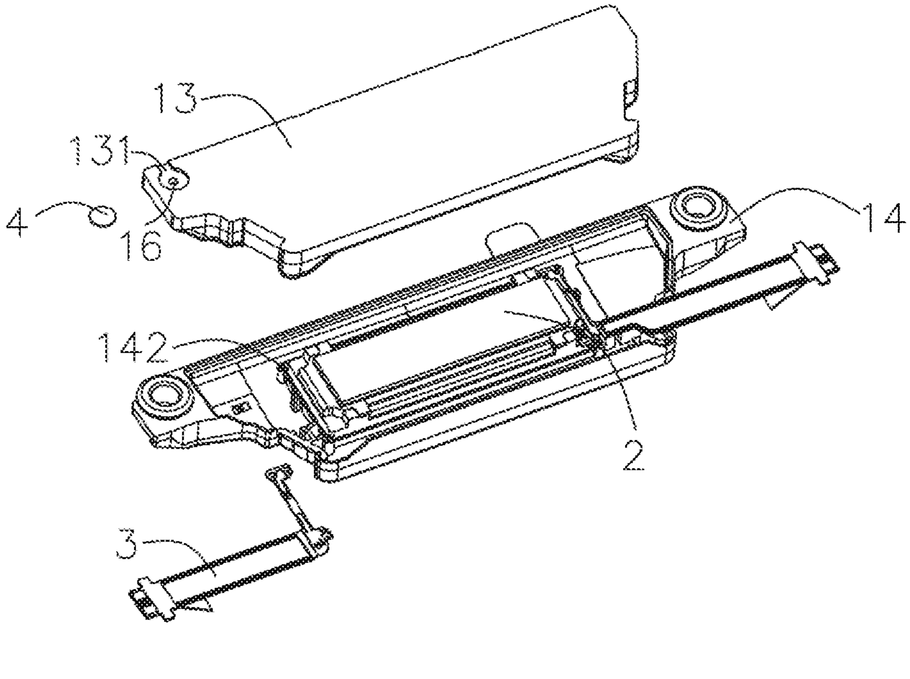
FIG. 2 is a partially exploded view of the speaker box of FIG. 1.
Figure 3:
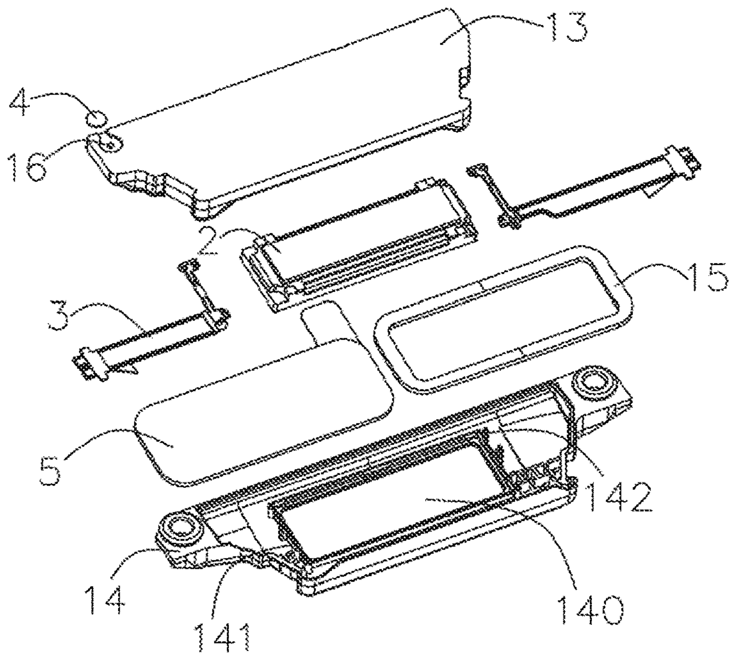
FIG. 3 is an exploded view of the speaker box of FIG. 1.
Figure 4:
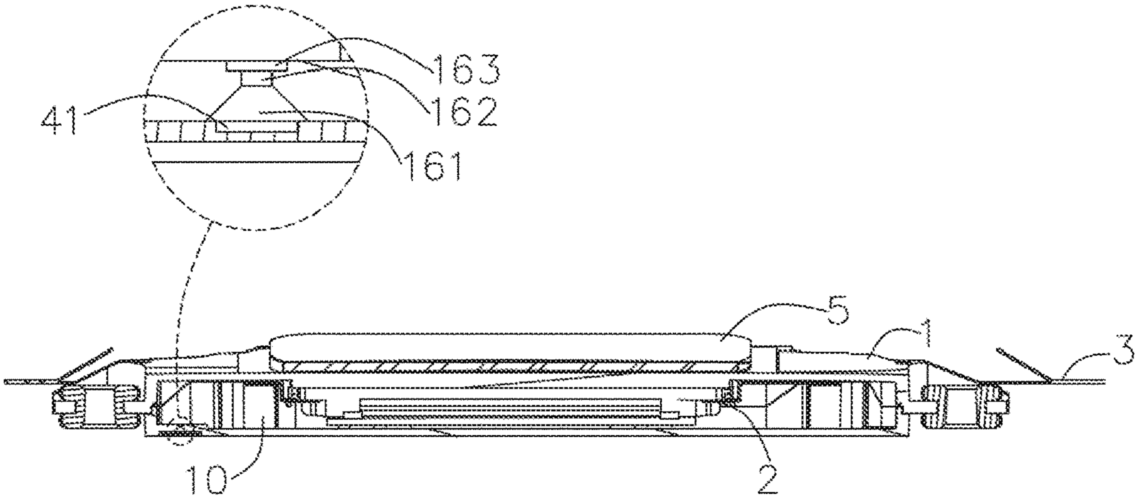
FIG. 4 is an illustrative cross-sectional view of the speaker box taken along line A-A of FIG. 1.
Figure 5:
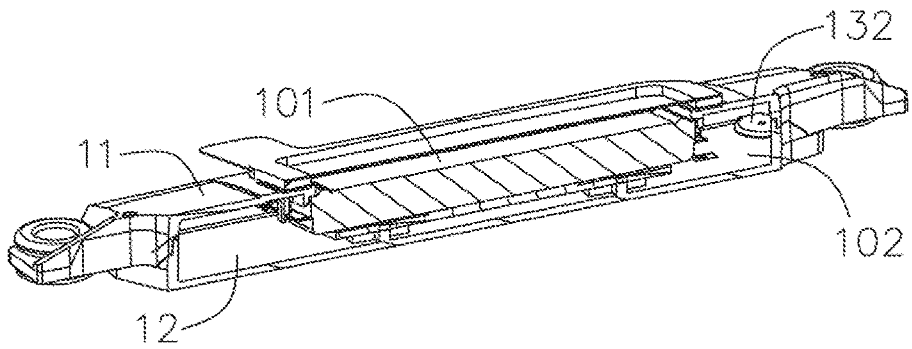
FIG. 5 is an illustrative cross-sectional view of the speaker box taken along line B-B of FIG. 1.
Figure 6:
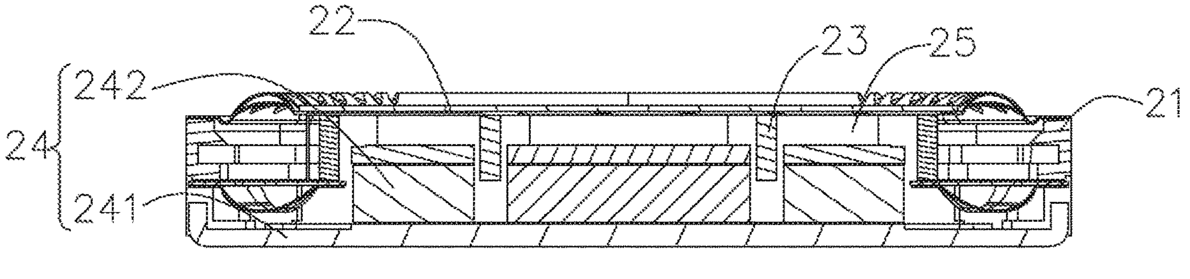
FIG. 6 is an illustrative cross-sectional view of the speaker of the speaker box of FIG. 1.

Referring to the FIGS. 1-6, the present invention provides one embodiment of a speaker box 100. The speaker box 100 includes a housing 1 having a receiving room 10, a speaker 2 received in the receiving room 10, a printed circuit board 3 providing electrical connections to the speaker 2, an air-permeable mesh 4 covering on the housing 1, and an air-permeable film 5.

The housing 1 includes an outer surface 11 and an inner surface 12 opposite to the outer surface 11. The speaker 2 separates the receiving room 10 into a front cavity 101 for transmitting a sound generated by the speaker 2 and a rear cavity 102 opposite to the front cavity 101. The housing 1 includes a lower housing 13, an upper housing 14 covered with the lower housing 13 and provided with an opening 140, and a spacer 15 arranged around the opening 140. The air-permeable film 5 locates on the spacer 15 and covers the opening 140. The inner surface 12 of the upper housing 14 includes a supporting platform 141 for mounting the speaker 2 and at least one positioning pillar 142 extending from the supporting platform 141. The positioning pillar 142 is used for fixing the printed circuit board 3.

The speaker 2 includes a frame 21, a diaphragm 22 supported on the frame 21, a voice coil 23 fixed with the diaphragm 22, and a magnetic circuit system 24 supported on the frame 21. The magnetic circuit system 24 includes a magnetic bowl 241 and a plurality of magnets 242 supported on the magnetic bowl 241. The speaker 2 has a back cavity 25 below the diaphragm 22, and the back cavity 25 is communicated with the rear cavity 102. The frame 21 is mounted with the supporting platform 141 of the upper housing 14. The printed circuit board 3 is sandwiched between the frame 21 and the magnetic bowl 241. The printed circuit board 3 is received in the receiving room 10 of the housing 1 and partially extends to outside.

The diaphragm 22 is disposed facing the opening 140 of the upper housing 14. The diaphragm 22, the upper housing 14, the spacer 15 and the air-permeable film 5 cooperate to form the front cavity 101. The upper housing 14, the lower housing 13, and the speaker 2 cooperate to form the rear cavity 102. The lower housing 13 includes a leakage hole 16 communicating the rear cavity 102 and the outside. The air-permeable mesh 4 covers the leakage hole 16 to prevent the dust and the water vapor from entering. A size of the leakage hole 16 located on the outer surface 11 of the housing 1 is larger than the size of the leakage hole 16 located on the inner surface 12 of the housing 1. The leakage hole 16 is used as a pressure equalizing hole between the rear cavity 102 and an external environment. The air-permeable mesh 4 can adjust the air permeability of the leakage hole 16.

The leakage hole 16 includes a first portion 161 with a size gradually decreasing by extending from the outer surface 11 of the housing 1 toward a direction of the inner surface 12, a second portion 162 extending from the first portion 161 toward the direction of the inner surface 12, and a third portion 163 extending from the second portion 162 toward the direction of the inner surface 12. The first portion 161 and the second portion 162 are combined to form a funnel shape. A size of the first portion 161 located on the outer surface 11 of the housing 1 is larger than the size of the third portion 163 located on the inner surface 12 of the housing 1.

A cross section of the first portion 161 along a vibration direction of the diaphragm 22 is a truncated cone, and the cross section of the first portion 161 along the direction perpendicular to the vibration direction of the diaphragm 22 is a circle. A cross section of the second portion 162 along the vibration direction of the diaphragm 22 is a rectangular shape, and the cross section of the second portion 162 along the direction perpendicular to the vibration direction of the diaphragm 22 is a circle. A cross section of the third portion 163 along the vibration direction of the diaphragm 22 is a rectangular shape, and the cross section of the third portion 163 along the direction perpendicular to the vibration direction of the diaphragm 22 is a circle. The size of the third portion 163 is larger than the size of the second portion 162. A height of the first portion 161 along a thickness direction of the housing 1 is greater than the height of the second portion 162 along the thickness direction of the housing 1, and the height of the second portion 162 along the thickness direction of the housing 1 is greater than the height of the third portion 163 along the thickness direction of the housing 1.

The lower housing 13 is provided with a recessed portion 131 receiving the air-permeable mesh 4 and a protruding portion 132 in the receiving room 10 corresponding to a position of the recessed portion 131. The recessed portion 131 is communicated with the leakage hole 16. The leakage hole 16 is located on the protruding portion 132. The air-permeable mesh 4 includes a groove 41 corresponding to the first portion 161 of the leakage hole 16. A length of the groove 41 is smaller than the size of the first portion 161 on the outer surface 11 of the housing 1.

Comparing with the related art, the present invention provides a speaker box including a housing having a receiving room and a speaker received in the receiving room. The speaker includes a frame, a diaphragm and a magnetic circuit system supported on the frame. The speaker separates the receiving room into a front cavity for transmitting a sound generated by the speaker and a rear cavity opposite to the front cavity. The speaker has a back cavity, and the back cavity is communicated with the rear cavity. The housing includes an outer surface and an inner surface opposite to the outer surface. The housing includes a leakage hole communicating the rear cavity and an outside. The speaker box further includes an air-permeable mesh covering the leakage hole. A size of the leakage hole located on the outer surface is larger than the size of the leakage hole located on the inner surface. By designing a unique shape of the leakage hole, the present invention avoids the problem of amplitude deviation easily caused by conventional leakage holes, thereby effectively improving the acoustic performance of the speaker box.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box, comprising:

a housing having a receiving room, the housing comprising an outer surface and an inner surface opposite to the outer surface; and a speaker received in the receiving room, the speaker having a back cavity, the speaker separating the receiving room into a front cavity for transmitting a sound generated by the speaker and a rear cavity opposite to the front cavity, the back cavity communicated with the rear cavity, the speaker comprising:

a frame;

a diaphragm supported on the frame;

a magnetic circuit system supported on the frame;

wherein the housing includes a leakage hole communicating the rear cavity and an outside, the speaker box further comprising an air-permeable mesh covering the leakage hole, a size of the leakage hole located on the outer surface is larger than the size of the leakage hole located on the inner surface;

wherein the leakage hole comprises a first portion with a size gradually decreasing by extending from the outer surface of the housing toward a direction of the inner surface and a second portion extending from the first portion toward the direction of the inner surface, a cross section of the second portion along the vibration direction of the diaphragm is a rectangular shape.

2. The speaker box as described in claim 1, wherein a cross section of the first portion along a vibration direction of the diaphragm is a truncated cone.

3. The speaker box as described in claim 1, wherein the leakage hole comprises a third portion extending from the second portion toward the direction of the inner surface, and a cross section of the third portion along the vibration direction of the diaphragm is a rectangular shape, and the size of the third portion is larger than the size of the second portion.

4. The speaker box as described in claim 1, wherein the housing is provided with a recessed portion receiving the air-permeable mesh and a protruding portion in the receiving room corresponding to a position of the recessed portion, and the leakage hole is located on the protruding portion.

5. The speaker box as described in claim 1, wherein the air-permeable mesh comprises a groove corresponding to the first portion of the leakage hole.

6. The speaker box as described in claim 1, wherein the housing comprises a lower housing provided with the leakage hole, an upper housing covered with the lower housing and provided with an opening, and a spacer arranged around the opening, the speaker box further comprising an air-permeable film located on the spacer and covering the opening, the diaphragm, the upper housing, the spacer and the air-permeable film cooperated to form the front cavity.

* * * * *